Sept. 15, 1953     H. H. HARADA     2,652,471
REMOTE ELECTRICAL DRIVE UNIT
Filed Sept. 19, 1951     2 Sheets-Sheet 1

Inventor
Henry H. Harada
By Willits, Helmig & Baillio
Attorneys

Sept. 15, 1953     H. H. HARADA     2,652,471
REMOTE ELECTRICAL DRIVE UNIT
Filed Sept. 19, 1951     2 Sheets-Sheet 2
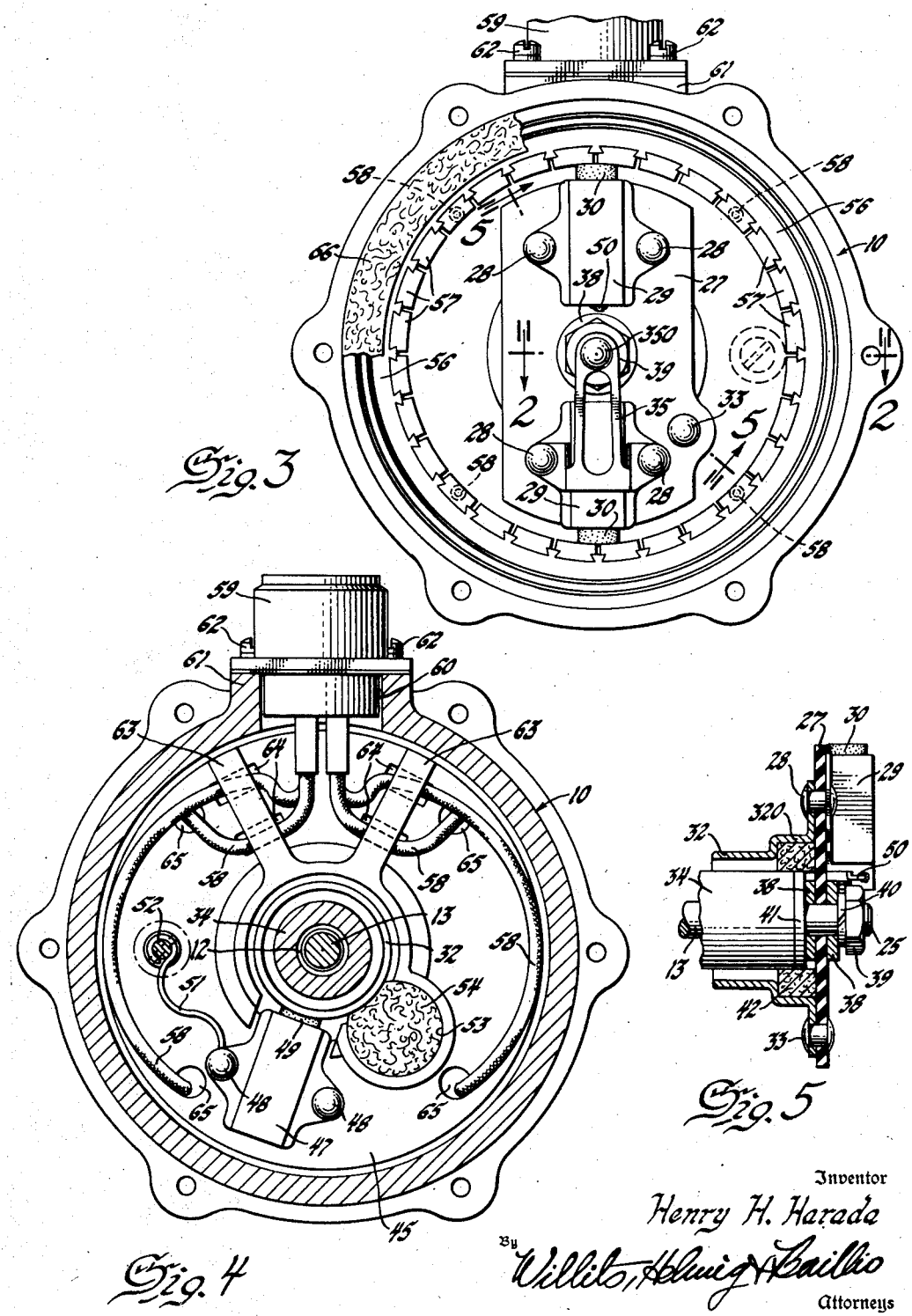
Inventor
Henry H. Harada Patented Sept. 15, 1953

2,652,471

UNITED STATES PATENT OFFICE 2,652,471

REMOTE ELECTRICAL DRIVE UNIT

Henry H. Harada, Grand Blanc, Mich., assignor to General Motors Corporation, Detroit, Mich., a corporation of Delaware Application September 19, 1951, Serial No. 247,205

10 Claims. (Cl. 201—55)

1

This invention relates to remote electrical drive units of the type employed to operate apparatus such as speedometers, odometers, tachometers or other instruments located at points remote from local rotating mechanism to which the remote electric drive unit is connected in mechanical operating relationship.

In many instances it is necessary or desirable to take readings on and recordings of the operating characteristics of apparatus such as the number and rate of revolutions thereof. For example, in the prior art, it has been customary to employ a synchronous speedometer-odometer instrument located on the instrument panel of an automobile in full view of the driver of the vehicle driven synchronously by remote electrical drive units connected in mechanical operating relationship to a rotating element in the transmission or the like.

This invention is an improvement over the Electrical Remote Control Drive disclosed and claimed in Patent No. 2,177,966 to Donald D. Waller et al., and, while the remote electrical drive unit herein disclosed operates on the same principle as prior art devices, the instant invention is directed to improved construction providing economy in manufacture, ease of assembly and disassembly and the elimination of certain service difficulties causing loss of power generated by the remote electrical drive unit.

It has been found that such minor defects as slight shaft misalignment causing undesirable noise which ofttimes is telegraphed to the passenger compartment of the automobile, the passage of fumes or oil to the synchronous generating mechanism, the accumulation of dust on the collector ring and the passage of brush dust to the bearings not only create service problems but often result in failure of the remote electrical drive unit to generate sufficient synchronous impulses to drive accurately a remotely located speedometer - odometer instrument electrically connected thereto.

With the foregoing in view, one object of the invention is to provide an improved economical to manufacture readily assembled remote electrical synchronous drive unit encased in a one-piece housing employing a one-piece rotating shaft which may be easily disassembled and serviced and reassembled with complete assurance of proper shaft alignment.

Another object of the invention is to provide an improved remote electric synchronous drive unit wherein dust accumulation from the brushes thereof is prevented from passing to the bearings

2 and wherein fumes and oil from the bearings is prevented from accumulating in and depositing on the commutator.

And still another object of the invention is to provide a generally improved and more reliable remote electrical drive unit having a longer trouble-free service life than heretofore possible with prior art construction.

Other objects of the invention will become apparent by reference to the following detailed description taken in connection with the accompanying drawings, in which:

Fig. 3 is a transverse sectional view taken on the line 3—3 of Fig. 1 looking in the direction indicated by the arrows.

Fig. 4 is a transverse sectional view taken on the line 4—4 of Fig. 1 looking in the direction indicated by the arrows.

Fig. 5 is a fragmentary longitudinal sectional view taken on the line 5—5 of Fig. 3.

Figure 1:
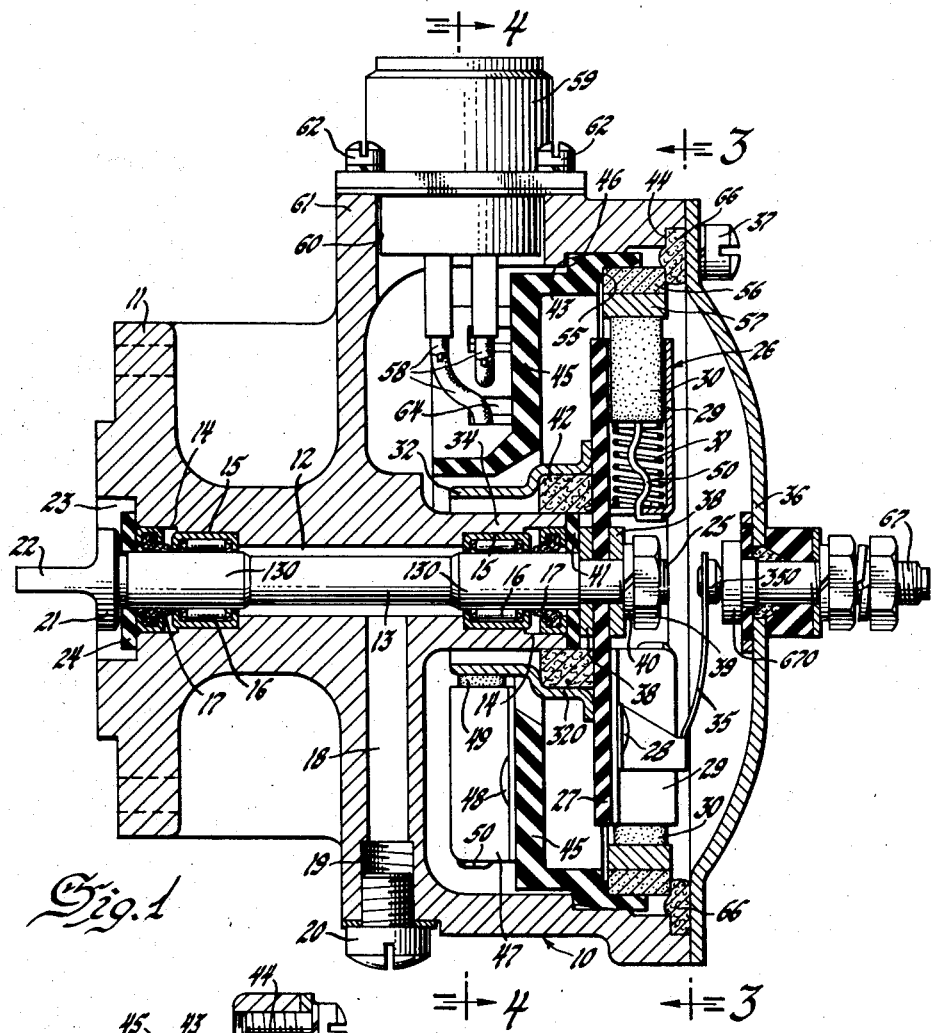
Fig. 1 is a vertical sectional view of a remote electrical drive unit embodying the invention taken substantially on the longitudinal center thereof.
Figure 2:
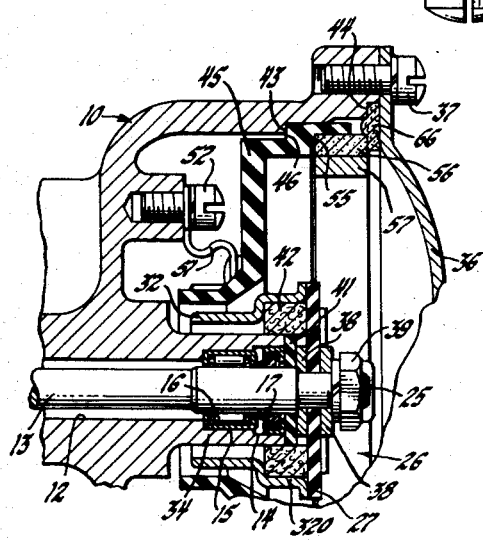
Fig. 2 is a fragmentary horizontal sectional view taken on the line 2—2 of Fig. 3.

Referring now to the drawings wherein like reference characters refer to like and corresponding parts throughout the several views, the particular embodiment of the remote electric drive unit disclosed for the purpose of illustrating the invention comprises, in general, improved construction of a small converter for converting or setting up a rotating field generating fluctuating current to be supplied to a synchronous motor whereby to rotate the said synchronous motor in synchronism with the said rotating field and operate such instruments as speedometers, odometers, tachometers or the like located remotely from the rotating apparatus from which the remote electric drive unit may be driven mechanically. Obviously, remote electric drive units may be employed to convert synchronously motion from any rotating means to the operation of any instrument or indicating device remote therefrom.

The remote electric drive unit illustrated in the drawings has a one-piece generally cylindrical housing 10 preferably formed as best shown in Fig. 1 having a suitable central support portion 112 with a mounting flange 11 at one end by which the drive unit is secured to the housing of a transmission or other driving means. The central support portion 112 of the housing 10 is centrally bored at 12 and oppositely counterbored at 14 and 15 to accommodate a driven shaft 13 having bearing surfaces 130 adjacent each end thereof rotatably mounted on spaced tubular type needle-bearings 16 and oppositely disposed oil seals 17 located outwardly of the said tubular type bearings 16. The said central bore 12 of the housing 10 is larger than the driven shaft 13 and has in communication therewith an oil bore 18 extending radially outward from the said central bore 12, the said central bore 12 and the oil bore 18 forming an oil chamber normally filled with lubricant for lubricating the bearings 16. The housing 10 is suitably counterbored and threaded at 19 at the outer end of the oil bore 18 to accommodate a suitable oil filler plug 20. This construction assures constant lubrication of the bearings 16 and maintains the lubricant within the bearing area. The left end of the driven shaft 13 as viewed in Fig. 1 is provided with a disc 21 from which a suitable key 22 extends axially for engagement into a key slot in a rotating drive member, not shown. The mounting flange 11 is recessed at 23 to accommodate the disc 21 of the driven shaft 13 and a suitable washer 24 disposed around the driven shaft 13 between the shaft disc 21 and the base of the recess 23 of the mounting flange 11.

The right end of the driven shaft 13 as viewed in Fig. 1 is reduced in size and threaded at its end 25 to accommodate a rotor assembly generally designated by the numeral 26 which is located within the annular or cylindrical housing portion 111 of the housing 10. The bottom or back edge of the cylindrical housing has an annular flange 113 extending inwardly to the mid-portion of the central support portion 112. This annular flange 113 which is formed integrally with the cylindrical housing portion and the central support portion supports the cylindrical housing portion and provides the bottom of the housing.

The rotor assembly is composed of a generally rectangular rotor plate 27 of Bakelite or other suitable rigid insulating material to which is secured by rivets 28 a pair of radially oppositely disposed brush holders 29 preferably of brass or other non-magnetic material each having mounted therein a carbon brush element 30 biased radially outward by a compression spring 31. To the side of the rotor plate 27 opposite the brush holders 29 is secured an annular bell shaped and flanged collector ring 32 by a rivet 33 and one of the rivets 28 securing one of the brush holders 29 thereto, the said collector ring 32 extending concentrically in spaced relationship over a central cylindrical stem 34 which is a part of the central support portion 112 of the housing 10. This construction connects one brush 30 electrically to the collector ring 32 while the other brush 30 has a spring contact arm 35 extending therefrom with a contact 350 thereon located axially central with respect to the rotor assembly 26 and biased axially outwardly therefrom into contact with the contact head 670 of a positive terminal 67 connected to a source of current, the said positive terminal being secured in insulated relationship to and through a cover assembly 36. The said cover assembly 36 is secured by screws 37 over the annular end of the cylindrical portion of the housing 10 as shown in Fig. 1. The rotor assembly 26 is disposed between two clamp washers 38 and fixed to the shouldered threaded end 25 of the driven shaft 13 by a nut 39 and lock washer 40. A washer 41 disposed around the driven shaft 13 between the innermost clamp washer and the annular end of the central cylindrical stem 34 of the housing 10 maintains the oil seal 17 adjacent thereto axially within the counterbore 15. Within the bell end 320 of the collector ring 32 is positioned a felt dust wiper 42 employed to prevent brush dust from getting into the bearings 16.

The inside of the wall of the cylindrical portion of the housing 10 is formed to provide annular seats 43 and 44 as best shown in Fig. 1. A centrally apertured cup shaped insulator ring 45 is positioned in the annular portion of the housing 10 with an outer annular shoulder 46 thereof seated on the annular seat 43 in the housing 10. A brush holder 47 is secured by rivets 48 to the bottom of the cup shaped insulator ring 45 in a radial position to permit the carbon brush element 49 therein to contact the collector ring 32. The brush holder 47 and carbon brush element 49 are like and similar to the brush holders 29 and carbon brush elements 30 except for the shape of the end of the carbon brush element 49. The brush element 49 is biased radially against the collector ring 32 by a compression spring within the brush holder 47. In each of the brush holders 29 and 47, a flexible connection 50 is employed between the brush holder and the brush element therewithin. A jumper wire 51 from the brush holder 47 is grounded to the housing 10 by a connector screw 52. The insulator ring 45 is provided with a pocket 53 suitably located to permit a felt dust wiper 54 compressed therein to bulge therefrom against the collector ring 32 and wipe the said collector ring 32 contacted by the brush 49 clean of brush dust.

The inside of the rim of the cup shaped insulator ring 45 is provided with an annular seat 55 into which is positioned a resistor ring 56 preferably formed of such material as resin bonded graphite. Into the inner periphery of the resistor ring 56 is cast a series of copper segments 57 which are contacted by the carbon brush elements 30 of the rotor assembly 26 as the said rotor assembly 26 is rotated by the driven shaft 13 onto which it is mounted. Connected to the resistor ring assembly at points 90 degrees apart are four leads 58 which are run to a connector element 59 disposed through a suitable aperture 60 in the top of the housing 10, the said connector element 59 being fixed to a collar 61 formed on the housing 10 around the said connector element aperture 60 by suitable studs 62. The said connector element 59 may be of any type to receive a mating connector to a four-conductor cable through which impulses developed by the remote electrical drive unit are transmitted to a synchronous speedometer-odometer instrument or the like located remote therefrom. The bottom of the cup shaped insulator ring 45 is provided with radially disposed lugs 63 and is apertured at 64 and 65 to accommodate the leads 58 and to provide for ease in accomplishing the running of the said leads 58 from the resistor ring assembly to the connector element 59.

The cup shaped insulator ring 45 with its outer lip 46 positioned on the annular seat 43 of the housing 10 and the resistor ring 56 positioned on the annular seat 55 of the insulator ring 45 are firmly seated and maintained in proper assembled relationship with respect to each other within the housing 10 by means of an annular compressible gasket 66 partially seated in the annular seat 44 of the housing 10 and compressed into pressure relationship against the resistor ring 56 by the cover assembly 36 when secured to the housing 10 by the studs 37.

Although but a single embodiment of the invention has been shown in the drawings and described in detail, it is obvious that many changes may be made in the size, shape, arrangement and detail of the various elements of the invention without departing from the spirit and scope thereof as defined in the appended claims.

I claim:

1. In a remote electrical drive unit of the class described, a one-piece generally cylindrical housing including an axially central stem axially bored and counterbored from opposite ends, spaced bearings in said counterbores, a driven shaft smaller in diameter than the axial bore through said central stem rotatably mounted through said bearings, oppositely disposed oil seals located outwardly from said bearings forming a lubricant reservoir therebetween, the said housing having a capped filler bore therein communicating with the said lubricant reservoir, a flange on one end of the said driven shaft terminating in a key engageable with means for rotating the said driven shaft, a rotor assembly fixed on the other end of the said driven shaft, a washer disposed around the driven shaft and over the axial end of the said axially central stem of the housing, and a dust seal carried by the said rotor overlapping the said washer and the adjacent peripheral end of the said axially central stem.

2. In a remote electrical drive unit of the class described, a one-piece generally cylindrical housing including an axially central stem axially bored and tier counterbored from opposite ends, spaced bearings in the inner of said counterbores, a driven shaft smaller in diameter than the said bore through the said central stem with enlarged bearing surfaces near the ends thereof rotatably mounted through said bearings, oppositely disposed oil seals located outwardly from said bearings in the outer of said counterbores forming a lubricant reservoir therebetween, the said housing having filler bore therein communicating with the said lubricant reservoir and forming a part thereof, a filler plug sealing said filler bore, a flange on one end of the said driven shaft terminating in a key engageable with means for rotating the said driven shaft, the other end of the said driven shaft being shouldered to accommodate a rotor assembly, a rotor assembly, means for securing the said rotor assembly onto the shouldered end of the said driven shaft, a washer disposed around the driven shaft and over the axial end of the said axially central stem of the housing, and a dust seal carried by the said rotor overlapping the said washer and the adjacent peripheral end of the said axially central stem.

3. In a remote electrical drive unit of the class described, a housing, a driven shaft rotatably mounted in the said housing, a cover on said housing, a terminal secured in insulated relationship to and through the said housing cover presenting a contact head within the housing axially opposite the said shaft, a rotor on said driven shaft rotatable therewith, the said rotor comprising a plate of insulating material, a pair of radially outwardly disposed brushes on one side thereof and a collector ring on the opposite side thereof to which one of the said brushes is connected, and a spring contact arm extending from the other of the said brushes including a contactor thereon located on the axis of rotation of the said driven shaft biased into contact with the contact head of the said terminal.

4. In a remote electrical drive unit of the class described, a one-piece cup shaped housing including a centrally disposed stem, a driven shaft rotatably mounted in the said central stem, a rotor assembly including radially outwardly biased brushes thereon mounted on the said driven shaft, stepped annular seats within said housing adjacent the annular end thereof, a cup shaped insulator ring within the said housing having a central aperture therein disposed in spaced relationship over the central stem of the said housing and seated on the innermost of the said annular seats in said housing, an annular seat within the rim of the said cup shaped insulator ring, a resistor ring having a series of spaced copper segments cast around the inner periphery thereof seated in the annular seat within the said cup shaped insulator ring, a compressible gasket seated on the outermost annular seat in said housing overlapping the said resistor ring, a cover on the annular end of the said housing, and studs securing the said cover on said housing compressing the said compressible gasket and thereby fixing the said cup shaped insulator ring and resistor ring in assembled relationship with the resistor ring in operational alignment in respect to the rotor.

5. In a remote electrical drive unit of the class described, a one-piece housing, a driven shaft rotatably mounted in the said housing, a cover on said housing, means for securing said cover on said housing, a terminal secured in insulated relationship to and through the said housing cover presenting a contact head within the housing axially opposite the said shaft, a rotor on said driven shaft rotatable therewith, the said rotor comprising a plate of insulating material, a pair of radially outwardly biased brushes on one side thereof and a collector ring on the opposite side thereof to which one of the said brushes is connected, and a spring contact arm extending from the other of the said brushes including a contactor thereon located on the axis of rotation of the said driven shaft biased into contact with the contact head of the said terminal, an insulator cup seated within said housing axially central in respect to the driven shaft, a resistor ring having a series of spaced copper segments cast around the inner periphery thereof seated within the insulator cup, a compressible gasket seated within the said housing overlapping the said resistor ring compressed by the said cover into engagement with the resistor ring and the said housing whereby to hold the insulator cup and resistor ring concentrically within the said housing in the desired radial alignment with respect to the said rotor with the rotor brushes in contact with spaced segments of the resistor ring, a radially inwardly disposed brush carried by said resistor ring biased to the said collector ring, a ground connection from the said last mentioned brush to said housing, a four conductor connector element extending through the said housing, and leads from 90 degree points on said resistor ring to the said connector element.

6. In a remote electrical drive unit of the class described, a one-piece housing, said housing having an axial central support portion, said central support portion being centrally bored, bearings in said bore at each end of said central support portion, a shaft rotatably mounted in said bearings, said housing having a bottom flange concentric to and extending from the mid-portion of said central support portion, and a cylindrical portion located coaxially with said central portion and extending from said bottom flange to a point beyond the end of said central support portion, a cover secured over the free end of said cylindrical portion, a rotor secured to said shaft at the end of said central support portion and located within said cylindrical portion, a rotor brush on said rotor, a ring in said cylindrical housing portion engaged by said rotor brushes, a collector ring secured to said rotor and surrounding the end of said central support portion, a stator brush on said housing engaging said collector ring.

7. In a remote electrical drive unit comprising, in combination; a one-piece generally cylindrical housing having an axially extending annular flange, an integrally formed bottom wall transverse to the axis of said housing and an axially central stem portion extending through said bottom wall and partially into the annular space defined by the said annular flange of said housing, said central stem being axially bored and counterbored from the opposite ends thereof; a shaft assembly within said central stem and comprising spaced bearings in said counterbores, a driven shaft mounted through said bearings, oppositely disposed oil seals located outwardly from said bearings and forming a lubricant reservoir therebetween, and a capped filler bore in said housing communicating with the said lubricant reservoir; a rotor assembly secured to the end of said shaft extending into said annular space in said housing and beyond the central stem thereof, said rotor assembly comprising a rotor plate of insulating material mounted near the end of said driven shaft in said annular space, a pair of radially outwardly disposed brushes and a collector ring mounted on said rotor plate, said collector ring being electrically connected to one of said brushes; a stator assembly comprising a cup-shaped insulator ring seated within said housing and having a central aperture therein disposed in spaced relationship over the central stem of said housing, a resistor ring including spaced copper segments around the periphery thereof contained within said cup-shaped insulator ring, and a stationary brush mounted on said insulating ring, said stationary brush being in electrical contact with said collector ring and electrically connected to said housing as a suitable ground; a cover on said housing, an insulated electric current supply terminal secured to and extending through said housing cover and presenting a contact head within the housing and a spring contact arm including a contactor thereon biased into contact with the contact head of the said terminal and connected to one of said rotor brushes.

8. In a remote electrical drive unit comprising, in combination; a one-piece generally cylindrical housing having an axially extending annular flange, an integrally formed bottom wall transverse to the axis of said housing and an axially central stem portion extending through said bottom wall and partially into the annular space defined by the said annular flange of said housing, said central stem being axially bored and counterbored from the opposite ends thereof; a shaft assembly within said central stem and comprising spaced bearings in said counterbores, a driven shaft mounted through said bearings, oppositely disposed oil seals located outwardly from said bearings and forming a lubricant reservoir therebetween, a capped filler bore in said housing communicating with the said lubricant reservoir, a washer disposed around the driven shaft and over the axial end of the said axially central stem extending into the annular space defined by the annular flange of said housing, and a dust seal overlapping the said washer and the adjacent peripheral end of the said axially central stem; a rotor assembly secured to the end of said shaft extending into said annular space in said housing and beyond the central stem thereof, said rotor assembly comprising a plate of insulating material mounted near the end of said driven shaft in said annular space, a pair of radially outwardly disposed brushes and a collector ring mounted on said rotor plate, said collector ring being electrically connected to one of said brushes; a stator assembly comprising a cup-shaped insulator ring seated within said housing and having a central aperture therein disposed in spaced relationship over the central stem of said housing, a resistor ring including spaced copper segments around the periphery thereof contained within said cup-shaped insulator ring, said rotor brushes being in electrical contact with said resistor ring, and a stationary brush mounted on said cup-shaped insulating ring, said stationary brush being in electrical contact with said collector ring and electrically connected to said housing as a suitable ground; a cover on said housing, an insulated electric current supply terminal secured to and extending through said housing cover and presenting a contact head within the housing and a spring contact arm including a contactor thereon biased into contact with the contact head of the said terminal and connected to one of said rotor brushes.

9. In a remote electrical drive unit comprising, in combination; a one-piece generally cylindrical housing having an axially extending annular flange, an integrally formed bottom wall transverse to the axis of said housing and an axially central stem portion extending through said bottom wall and partially into the annular space defined by the said annular flange of said housing, said central stem being axially bored and counterbored from the opposite ends thereof; a shaft assembly within said central stem and comprising spaced bearings in said counterbores, a driven shaft mounted through said bearings, oppositely disposed oil seals located outwardly from said bearings and forming a lubricant reservoir therebetween, and a capped filler bore in said housing communicating with the said lubricant reservoir; a rotor assembly secured to the end of said shaft extending into said annular space in said housing and beyond the central stem thereof, said rotor assembly comprising a plate of insulating material mounted near the end of said driven shaft in said annular space, a pair of radially outwardly disposed brushes on one side of said plate and a collector ring on the opposite side thereof electrically connected to one of said brushes; a stator assembly comprising a cup-shaped insulator ring seated within said housing and having a central aperture therein disposed in spaced relationship over the central stem of said housing, a resistor ring including spaced copper segments cast around the periphery thereof contained within said cup-shaped insulator ring, said rotor brushes being in electrical contact with said resistor ring, and a stationary brush mounted on said cup-shaped insulating ring, said stationary brush being in electrical contact with said collector ring and electrically connected to said housing as a suitable ground; a cover on said housing, an insulated electric current supply terminal secured to and extending through said housing cover and presenting a contact head within the housing and a spring contact arm including a contactor thereon biased into contact with the contact head of the said terminal and connected to one of said rotor brushes.

10. In a remote electrical drive unit comprising, in combination; a one-piece generally cylindrical housing having an axially extending annular flange, an integrally formed bottom wall transverse to the axis of said housing and an axially central stem portion extending through said bottom wall and partially into the annular space defined by the said annular flange of said housing, said central stem being axially bored and counterbored from the opposite ends thereof; a shaft assembly within said central stem and comprising spaced bearings in said counterbores, a driven shaft mounted through said bearings, oppositely disposed oil seals located outwardly from said bearings and forming a lubricant reservoir therebetween, a capped filler bore in said housing communicating with the said lubricant reservoir, a washer disposed around the driven shaft and over the axial end of the said axially central stem extending into the annular space defined by the annular flange of said housing, and a dust seal overlapping the said washer and the adjacent peripheral end of the said axially central stem; a rotor assembly secured to the end of said shaft extending into said annular space in said housing and beyond the central stem thereof, said rotor assembly comprising a plate of insulating material mounted near the end of said driven shaft in said annular space, a pair of radially outwardly disposed brushes on one side of said plate and a collector ring on the opposite side thereof electrically connected to one of said brushes; a stator assembly comprising a cup-shaped insulator ring seated within said housing and having a central aperture therein disposed in spaced relationship over the central stem of said housing, a resistor ring including spaced copper segments cast around the periphery thereof contained within said cup-shaped insulator ring, said rotor brushes being in electrical contact with said resistor ring, and a stationary brush mounted on said cup-shaped insulating ring, said stationary brush being in electrical contact with said collector ring and electrically connected to said housing as a suitable ground; a cover on said housing, an insulated electric current supply terminal secured to and extending through said housing cover and presenting a contact head within the housing and a spring contact arm including a contactor thereon biased into contact with the contact head of the said terminal and connected to one of said rotor brushes.

HENRY H. HARADA.

References Cited in the file of this patent
UNITED STATES PATENTS

| Number | Name | Date |
|---|---|---|
| 2,177,966 | Waller et al. | Oct. 31, 1939 |
| 2,526,621 | Leibing et al. | Oct. 24, 1950 |